Patented Dec. 3, 1935

2,023,374

UNITED STATES PATENT OFFICE 2,023,374

BUTYL-ACETONIC FERMENTATION PROCESS

Hugh R. Stiles, Terre Haute, Ind., assignor to Commercial Solvents Corporation, Terre Haute, Ind., a corporation of Maryland No Drawing. Application November 28, 1932, Serial No. 644,693

22 Claims. (Cl. 260—135)

The present invention relates to the fermentation of starch mashes containing substantial amounts of sugar by means of butyl-acetonic bacteria. More specifically, the present invention relates to the fermentation of corn mashes containing "hydrol" by means of organisms of the type *Clostridium acetobutylicum* (Weizmann).

Prior to the present invention it has been found that if substantial amounts of cheap sugar solutions such as "hydrol" (the residual mother liquor from the crystallization of corn sugar) are substituted for the more expensive starchy carbohydrates such as corn in the butyl-acetonic fermentation, a sluggish fermentation results. This sluggish fermentation has been found not only to require a longer time to reach completion, but also to give rise to lower yields and a lower ratio of butyl alcohol in the products. Up to the present time therefore, only small amounts of such sugar-containing substances have been substituted for starchy carbohydrates in the butyl-acetonic fermentation.

It has now been found that the difficulties previously encountered when substituting substantial amounts of sugar-containing substances such as hydrol for the starchy materials, can be overcome by the addition of very small amounts of alkaline reacting materials which form organic acid salts which are fermentable by the butyl-acetonic bacteria.

The process of the present invention is applicable to the fermentation of starchy carbohydrate mashes generally, in which a substantial proportion of the starchy material has been replaced by sugar-containing material. For example, the process may be applied to corn, rye, potato, cassava, and the like mashes in which a substantial proportion of the starchy material has been replaced by hydrol, molasses, or other crude sugar-containing materials. The process may be said to be generally applicable to the fermentation of such mashes by means of butyl-acetonic bacteria. By the term "butyl-acetonic bacteria", however, is meant the true starch fermenting organisms of the type *Clostridium acetobutylicum* (Weizmann), as for example, those described by McCoy et al., Journal of Infectious Diseases, 39, 457, 1926.

The alkaline materials which are suitable for use in the present process are those materials which form fermentable salts with the acids produced in the butyl-acetonic fermentation, e. g., acetic and butyric acids. Among the substances which have been found to be suitable may be mentioned alkali compounds such as sodium carbonate, potassium carbonate, disodium phosphate, sodium acetate, etc.; alkaline earth compounds such as calcium carbonate, calcium hydroxide, barium carbonate, calcium acetate, etc.; and ammonium compounds such as ammonium carbonate and ammonium acetate. Although all of these materials have been found to be satisfactory for the process of the present invention, it is preferred in most cases to use calcium carbonate.

It is to be noted that the "alkaline materials" or "alkaline reacting materials" referred to in this specification and in the appended claims, may be very weakly alkaline and relatively insoluble so that when added, even in excess, to a buffered mash or a mash containing acid salts, an acid reaction rather than an alkaline reaction is secured. For example, calcium carbonate, the material which is generally preferred to be used, produces a hydrogen ion concentration in the neighborhood of 6.0 in most mashes. A hydrogen ion concentration of this order of magnitude is desirable in practically all cases so that it is to be understood that although alkaline materials are utilized for attaining the object of this invention, an alkaline reaction of the mash is not desirable.

Since ammonia is utilized to some extent by the butyl-acetonic bacteria, ammonium compounds of relatively strong acids are not to be taken as included in this classification. Such compounds as diammonium phosphate, for example, are found to have a deleterious effect upon the fermentation due to the utilization of part of the ammonia by the organisms with resulting increased acidity caused by the resulting free phosphoric acid. It is to be understood, therefore, that the terms "alkaline compounds which form fermentable salts of acetic and butyric acids" and "alkaline compounds of alkali and alkaline earth metals", as used in the specification and claims, are to be taken as including alkaline ammonium compounds of weak acids, but not of strong acids. It should also be noted that while alkaline phosphates such as disodium phosphate are advantageous in preventing some of the disadvantages referred to above, the presence of the phosphate ion has been found to materially affect the ratio of solvents produced in the fermentation so that it is preferred to utilize compounds other than phosphates.

The alkaline materials which are utilized in the present invention may be employed in extremely small concentrations, i. e., less than one-tenth of one per cent on the weight of the mash. The amount to be added in any particular case will depend upon the initial acidity of the mash and upon the amount of sugar-containing material which is substituted for starchy carbohydrate. In general, it may be said that from 0.01% to 0.1% on the weight of the mash will be found to be satisfactory. In the case of corn mashes containing from 20 to 35% hydrol, for example, an addition of 0.025 to 0.05% of calcium carbonate has been found to be satisfactory. While it has been found that alkaline buffering materials such as corn germ meal, soy bean meal, and the like, are not sufficient in themselves to effect the improved results of the present invention, yet they exert some beneficial effect and where substantial amounts of these materials are present, somewhat smaller concentrations of the inorganic alkaline buffering materials may be employed.

It has also been found that when employing the alkaline compounds of the present invention, further improved results may be secured by regulating the temperature of the fermentation in accordance with the amount of alkaline material added. Whereas the normal temperature for the fermentation of a starchy carbohydrate mash by means of organisms of the type *Clostridium acetobutylicum* (Weizmann) is 37° C., it has been found to be desirable to lower this temperature from 1 to 2 degrees, depending upon the amount of alkaline material added. For example, when substituting hydrol for 25% of the corn in a corn meal mash and adding 0.025% of calcium carbonate, a fermentation temperature of 36° C. has been found to be satisfactory and when substituting 35% of hydrol for corn and adding 0.05% calcium carbonate, a temperature of 35° C. has been found to be preferable.

The theory of the operation of the present invention is not understood. The addition of alkaline material does not constitute merely a neutralization of the mash since a corn-hydrol mash, for example, has an acidity well within the operative range for organisms of this type. Likewise, it would seem that it is not merely effecting a necessary increase in the buffer content of the sugar-containing material since if part of the corn mash, for example, is replaced by pure starch (having no buffer content) the difficulties met with in the sugar substitution are not encountered. The complex nature of the effect of substituting sugar-containing materials for a part of the starchy carbohydrate in the mash may be seen from the fact that the difficulties encountered are exceedingly more pronounced when operating on a commercial scale than when carrying out laboratory flask fermentations. It may be possible that the effect of this substitution in some way increases the oligo-dynamic effect of the metallic fermenters (see for example, H. Langwell "Oligo-dynamic action of metals", Journal of the Society of Chemistry & Industry, 51, 701, 1932). However, irrespective of the theory of operation, it remains that the present invention eliminates to a large degree the difficulties previously encountered in the substitution of sugar-containing materials for a part of the carbohydrate in mashes for the butyl-acetonic fermentation.

When the present invention is employed, it has been found that the fermentation time for starch-sugar mashes is reduced from 10 to 20%—an improvement which obviously has considerable commercial importance. Furthermore, the yield is somewhat improved and the ratio of butanol in the products is somewhat raised, both of which effects add to the economic value of the process. Also, by the use of the present invention, it is possible to substitute a larger proportion of cheap sugar-containing materials for the starchy carbohydrate previously employed, thus effecting a further economy in operation. Some of the advantages of this process may be seen from the following table:

*Table I*

| No. | Percent hydrol substitution | CaCO₃ added | Final pH | Percent on dry whole corn equivalent | BuOH ratio |
|---|---|---|---|---|---|
| | | Grams per liter | | | Percent |
| 1 | Nil | Nil | 4.51 | 25.77 | 59.9 |
| 2 | 25 | Nil | 4.31 | 25.23 | 61.1 |
| 3 | 25 | 0.20 | 4.53 | 25.92 | 61.0 |
| 4 | 30 | Nil | 4.31 | 24.95 | 60.5 |
| 5 | 30 | 0.26 | 4.61 | 25.72 | 60.9 |

The method of carrying out the present invention may probably best be illustrated by the following specific examples:

*Example I*

A corn meal mash containing approximately 8% corn meal by weight (wet basis) is prepared and subjected to the action of live steam at a pressure of 25–29 lbs. per sq. in. for approximately 90 minutes in a pressure cooker provided with a suitable agitator. A second mash consisting of 50% corn meal mash of 8% concentration and 50% hydrol mash of approximately 8% sugar concentration containing 0.05% pulverized calcium carbonate by weight is prepared and is cooked in a like manner for about 90 minutes at a pressure of 10–14 lbs. per sq. in. These two "cooks" of mash consisting of about 5600 gallons each are cooled to approximately 37° C. and are then introduced into a 60,000 gallon fermenter which has previously been entirely sterilized. The mash is then inoculated with about 2% by volume of a culture of the type *Clostridium acetobutylicum* (Weizmann). At subsequent intervals of about four hours, additional mash is added in lots of two cooks, i. e., one cook each of the two mashes above described, until a total of eight cooks have been introduced. The fermentation is then allowed to proceed to completion in the normal manner.

*Example II*

Mashes are prepared as in Example I with the exception that the calcium carbonate is not included in the corn-hydrol mash. One cook each of the two mashes is introduced into the fermenter and inoculated in the usual manner. Three succeeding lots of two cooks each are then added as in Example I with the exception that at the time of adding the third and fourth cooks of corn-hydrol mash, separately sterilized soda ash solution amounting to 0.08% by weight of the corn-hydrol mash is simultaneously added to the fermenting mash.

It is to be noted that if water-soluble alkaline materials are utilized in the present invention, the material should not all be added at the beginning of the fermentation since in such a case an undesirable alkaline reaction of the mash would result. When such materials are employed, it is preferable that they be added during the period of active fermentation prior to the "acidity peak". This may be accomplished in a number of ways, as for example, by adding a sterile solution of the material at short intervals during this stage of the fermentation. However, it is satisfactory in most cases to add the material in a part of the mash as in Example II above. The particular procedure to be employed may readily be chosen by one skilled in the art to fit the particular conditions encountered.

It is to be understood that the present invention is not to be limited to the particular materials, or operating methods sepcifically mentioned above. Any equivalents or modifications of procedure which would occur to one skilled in the art may be employed without departing from the spirit of the invention. It will also be apparent to one skilled in the art that very small amounts of sugar-containing materials may be substituted for a part of the starch in a mash without the result of a determinable decrease in yield, and that it would be unnecessary to apply the present invention in such cases. This invention, therefore, applies only where the mash contains a substantial proportion of sugar-containing material, i. e., a proportion sufficient to reduce the yield if the present improvement is not utilized.

The invention now having been described, what is claimed is:

1. In a process for the fermentation of a starchy carbohydrate mash containing a substantial proportion of sugar-containing material by means of organisms of the type *Clostridium acetobutylicum* (Weizmann), the step which comprises introducing into the mash from 0.01 to 0.1% of an alkaline material capable of forming fermentable salts of acetic and butyric acids.

2. In a process for the fermentation of a starchy carbohydrate mash containing from 20 to 40% of hydrol by means of organisms of the type *Clostridium acetobutylicum* (Weizmann), the step which comprises introducing into the mash from 0.01 to 0.1% of an alkaline material capable of forming fermentable salts of acetic and butyric acids.

3. In a process for the fermentation of a starchy carbohydrate mash containing a substantial proportion of sugar-containing material by means of organisms of the type *Clostridium acetobutylicum* (Weizmann), the steps which comprise introducing into the mash from 0.01 to 0.1% of an alkaline material capable of forming fermentable salts of acetic and butyric acids and carrying out the fermentation at a temperature of 35–37° C.

4. In a process for the fermentation of a starchy carbohydrate mash containing from 20 to 40% of hydrol by means of organisms of the type *Clostridium acetobutylicum* (Weizmann), the steps which comprise introducing into the mash from 0.01 to 0.1% of an alkaline material capable of forming fermentable salts of acetic and butyric acids and carrying out the fermentation at a temperature of 35–37° C.

5. In a process for the fermentation of a starchy carbohydrate mash containing a substantial proportion of sugar-containing material by means of organisms of the type *Clostridium acetobutylicum* (Weizmann), the step which comprises introducing into the mash from 0.01 to 0.1% of an alkaline compound of an alkali metal.

6. In a process for the fermentation of a starchy carbohydrate mash containing a substantial proportion of sugar-containing material by means of organisms of the type *Clostridium acetobutylicum* (Weizmann), the step which comprises introducing into the mash from 0.01 to 0.1% of an alkaline compound of an alkaline earth metal.

7. In a process for the fermentation of a starchy carbohydrate mash containing a substantial proportion of sugar-containing material by means of organisms of the type *Clostridium acetobutylicum* (Weizmann), the step which comprises introducing into the mash from 0.01 to 0.1% of an ammonium salt of a weak acid.

8. In a process for the fermentation of a starchy carbohydrate mash containing a substantial proportion of sugar-containing material by means of organisms of the type *Clostridium acetobutylicum* (Weizmann), the step which comprises introducing into the mash from 0.01 to 0.1% of an alkaline compound of sodium.

9. In a process for the fermentation of a starchy carbohydrate mash containing a substantial proportion of sugar-containing material by means of organisms of the type *Clostridium acetobutylicum* (Weizmann), the step which comprises introducing into the mash from 0.01 to 0.1% of an alkaline compound of calcium.

10. In a process for the fermentation of a starchy carbohydrate mash containing a substantial proportion of sugar-containing material by means of organisms of the type *Clostridium acetobutylicum* (Weizmann), the step which comprises introducing into the mash from 0.01 to 0.1% of calcium carbonate.

11. In a process for the fermentation of a starchy carbohydrate mash containing from 20 to 40% of hydrol by means of organisms of the type *Clostridium acetobutylicum* (Weizmann), the step which comprises introducing into the mash from 0.01 to 0.1% of an alkaline compound of an alkali metal.

12. In a process for the fermentation of a starchy carbohydrate mash containing from 20 to 40% of hydrol by means of organisms of the type *Clostridium acetobutylicum* (Weizmann), the step which comprises introducing into the mash from 0.01 to 0.1% of an alkaline compound of an alkaline earth metal.

13. In a process for the fermentation of a starchy carbohydrate mash containing from 20 to 40% of hydrol by means of organisms of the type *Clostridium acetobutylicum* (Weizmann), the step which comprises introducing into the mash from 0.01 to 0.1% of an ammonium salt of a weak acid.

14. In a process for the fermentation of a starchy carbohydrate mash containing a substantial proportion of sugar-containing material by means of organisms of the type *Clostridium acetobutylicum* (Weizmann), the steps which comprise introducing into the mash from 0.01 to 0.1% of an alkaline compound of an alkali metal and carrying out the fermentation at a temperature of 35 to 37° C.

15. In a process for the fermentation of a starchy carbohydrate mash containing a substantial proportion of sugar-containing material by means of organisms of the type *Clostridium acetobutylicum* (Weizmann), the steps which comprise introducing into the mash from 0.01 to 0.1% of an alkaline compound of an alkaline earth metal and carrying out the fermentation at a temperature of 35 to 37° C.

16. In a process for the fermentation of a starchy carbohydrate mash containing a substantial proportion of sugar-containing material by means of organisms of the type *Clostridium acetobutylicum* (Weizmann), the steps which comprise introducing into the mash from 0.01 to 0.1% of an ammonium salt of a weak acid and carrying out the fermentation at a temperature of 35 to 37° C.

17. In a process for the fermentation of a starchy carbohydrate mash containing from 20 to 40% of hydrol by means of organisms of the type *Clostridium acetobutylicum* (Weizmann), the steps which comprise introducing into the mash from 0.01 to 0.1% of an alkaline compound of an alkali metal and carrying out the fermentation at a temperature of 35 to 37° C.

18. In a process for the fermentation of a starchy carbohydrate mash containing from 20 to 40% of hydrol by means of organisms of the type *Clostridium acetobutylicum* (Weizmann), the steps which comprise introducing into the mash from 0.01 to 0.1% of an alkaline compound of an alkaline earth metal and carrying out the fermentation at a temperature of 35 to 37° C.

19. In a process for the fermentation of a starchy carbohydrate mash containing from 20 to 40% of hydrol by means of organisms of the type *Clostridium acetobutylicum* (Weizmann), the steps which comprise introducing into the mash from 0.01 to 0.1% of an ammonium salt of a weak acid and carrying out the fermentation at a temperature of 35 to 37° C.

20. In a process for the fermentation of a starchy carbohydrate mash containing from 20 to 40% of hydrol by means of organisms of the type *Clostridium acetobutylicum* (Weizmann), the steps which comprise introducing into the mash from 0.01 to 0.1% of an alkaline compound of sodium and carrying out the fermentation at a temperature of 35 to 37° C.

21. In a process for the fermentation of a starchy carbohydrate mash containing from 20 to 40% of hydrol by means of organisms of the type *Clostridium acetobutylicum* (Weizmann), the steps which comprise introducing into the mash from 0.01 to 0.1% of an alkaline compound of calcium and carrying out the fermentation at a temperature of 35 to 37° C.

22. In a process for the fermentation of a starchy carbohydrate mash containing from 20 to 40% of hydrol by means of organisms of the type *Clostridium acetobutylicum* (Weizmann), the steps which comprise introducing into the mash from 0.01 to 0.1% of calcium carbonate and carrying out the fermentation at a temperature of 35 to 37° C.

HUGH R. STILES